No. 652,594. Patented June 26, 1900.
W. H. COOK.
CENTRIFUGAL MACHINE.
(Application filed Apr. 24, 1900.)
(No Model.) 2 Sheets—Sheet 1.
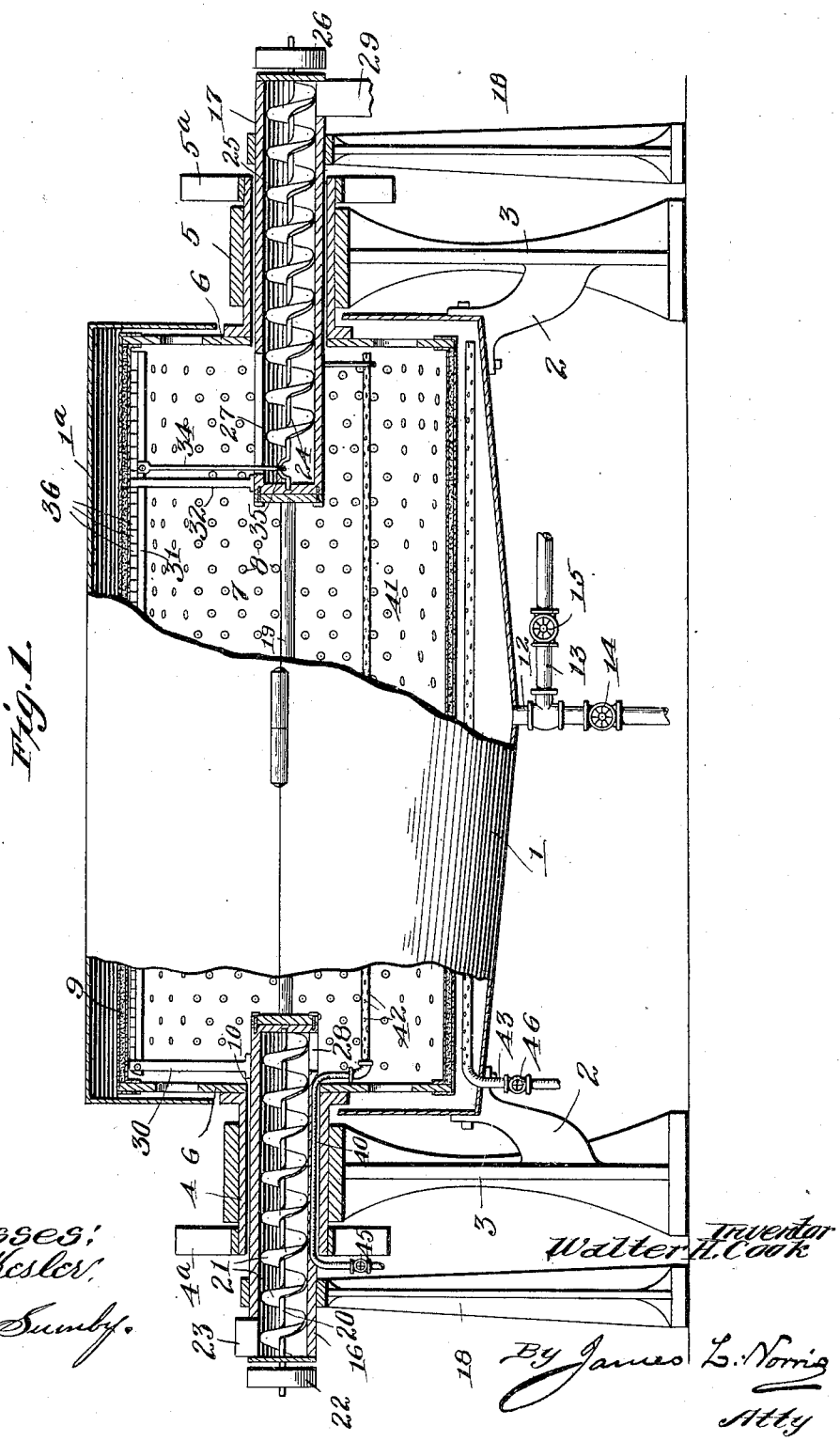

No. 652,594. Patented June 26, 1900.
W. H. COOK.
CENTRIFUGAL MACHINE.
(Application filed Apr. 24, 1900.)
(No Model.) 2 Sheets—Sheet 2.
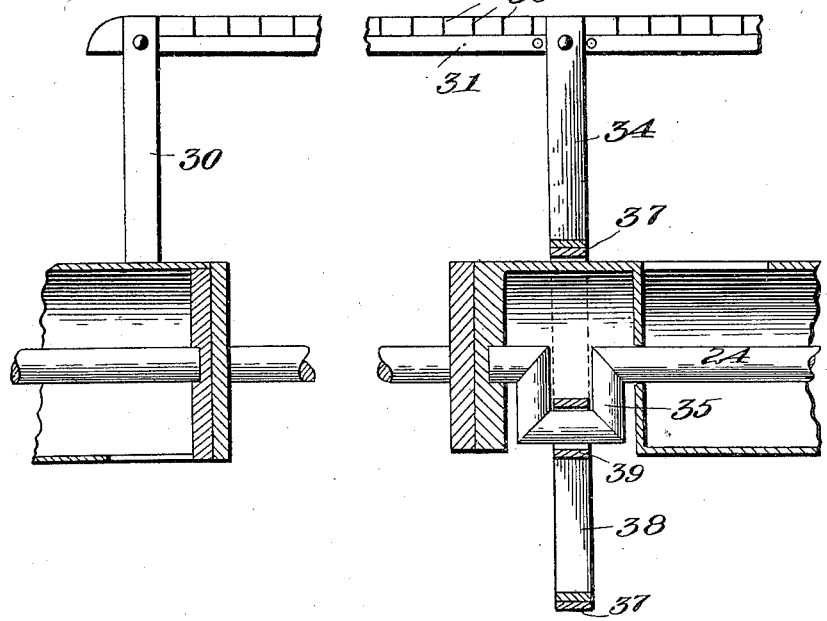
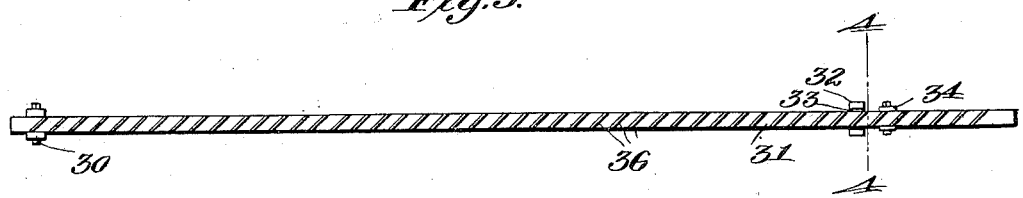
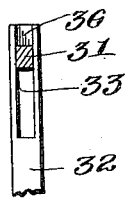
Witnesses:
C. D. Kesler
Dennis Dumby
Inventor
Walter H. Cook
By James L. Norris
Atty

UNITED STATES PATENT OFFICE.

WALTER H. COOK, OF NEW ORLEANS, LOUISIANA.

CENTRIFUGAL MACHINE.

SPECIFICATION forming part of Letters Patent No. 652,594, dated June 26, 1900.

Application filed April 24, 1900. Serial No. 14,146. (No model.)

*To all whom it may concern:*

Be it known that I, WALTER H. COOK, a citizen of the United States, residing at New Orleans, in the parish of Orleans and State of Louisiana, have invented new and useful Improvements in Centrifugal Separators, of which the following is a specification.

My invention relates to centrifugal separators for eliminating one or more of the constituents of fluid or other substances.

My purpose is to provide a centrifugal separator which shall be capable of treating fluids, as well as substances which are not fluid, but which have been either naturally or artificially brought into a condition suitable for treatment by granulation, pulverization, or other preparatory process.

It is my object also to provide means for automatically feeding non-liquid substances to the separator, for accurately controlling the rate of their feed, for regulating the passage of material through the separator, and for making its volume and movement substantially uniform at all points in the separator.

It is a further purpose of my invention to provide a centrifugal separator with simple means for removing deposits or accumulations of separated material from its interior, this feature of my invention being capable by its construction of giving a forward movement to the material treated and adapted by a simple adjustment to permit the deposit on the inner surface of the rotating member of one or more of the constituents of a substance under treatment suitable for a filtering material, said deposit being maintained by my invention at a predetermined uniform thickness as long as its utilization as a filtering medium is required.

It is my object also to provide simple and efficient means whereby the separator may be quickly and thoroughly cleansed without arresting its rotation.

My invention also comprises other novel and useful features, all of which will be fully described in the following specification and then particularly pointed out and defined in the claims.

For the purposes of the following description reference is had to the accompanying drawings, in which—

Figure 1 is a central vertical section taken longitudinally, showing a centrifugal separator constructed in accordance with my invention. Fig. 2 is a sectional elevation showing a modified construction of the mechanism for operating the scraper. Fig. 3 is a detail view of the scraper, showing the means for carrying the material treated forward and the vertical guide for the vibrating end of the scraper. Fig. 4 is a section on the line 4 4 in Fig. 3.

The reference-numeral 1 in said drawings indicates a stationary outer cylinder, its ends supported by brackets 2, which form part of posts or uprights 3. The latter form journal-supports for hollow or tubular shafts 4 and 5, projecting from the ends 6 of a drum or cylinder 7, having numerous perforations 8. The drum 7 is usually constructed with two concentric perforated walls having an intermediate layer 9 of filtering material. The outside diameter of this drum is suitably less than the interior of the outer cylinder 1. The tubular shafts 4 and 5 are provided with driving-pulleys 4ª and 5ª and enter the ends of the cylinder 1 through openings 10. The upper part 1ª of said outer cylinder is hinged to the lower part, so that it can be opened, and said upper part is of less length than the lower, so that any material thrown off by the revolution of the drum 7 and adhering to the ends of said upper part will fall into the lower portion. The lower wall of the outer cylinder is depressed at the center, thereby giving the wall on each side a downward inclination toward the lowest point, where a pipe 12 is provided having a lateral branch 13. The pipe 12 is provided below said lateral branch with a valve 14, and a similar valve 15 is placed in the branch 13.

Within the tubular shafts 4 and 5, respectively, are arranged cylindrical boxes 16 and 17, supported on posts 18 and having no contact with the shafts through which they pass. These boxes project a suitable distance into the ends of the drum 7 and extend beyond the outer ends of the shafts 4 and 5. Their closed inner or adjacent ends are connected by a brace-bar 19, which stiffens and aids in supporting said boxes. The box 16 is provided with a central interior shaft 20, upon which is a spiral conveyer 21, driven by a pulley 22 on the projecting outer end of the shaft 20. At or near the outer end of said box is a hopper opening or inlet 23 in the upper side. The box 17, which is longer and extends into the end of the drum 7 farther than the box 16, is also provided with an interior shaft 24, which carries a spiral conveyer 25, driven by a pulley 26 on the projecting outer end of the shaft 24. This box is provided with a receiving-opening 27 in its upper wall, extending from a point at or near the inner end of the box to the inner end of the drum 7, or thereabout. This opening receives the material remaining in the drum 7 after a separation has been effected, while the hopper or inlet opening 23 in the box 16 receives the material fed to the separator, into which it passes through a feed-opening 28 at the inner end of said box 16. The box 17 is provided with an outlet 29 at its outer end, through which is discharged the material entering said box 17 from the interior of the drum 7 through the receiving-opening 27.

Upon the inner end of the box 16, close to the end of the drum 7, is a fixed upright 30, its upper end lying close to the inner face of the drum 7. Upon said upper end is pivotally mounted a scraper-bar 31, which extends nearly to the other end of the drum, parallel, or nearly so, with the cylindrical wall. Upon the inner end of the box 17 is a rigid upright 32, provided at its upper end with a vertical slot 33, in which the scraper-bar 31 is free to move. A pitman 34, pivoted to said bar and connected to a crank 35 on the shaft 24, gives a rapid vibration on reciprocation in a vertical plane to the scraper-bar. Upon the upper side of the latter are mounted a series of deflecting-plates 36, which lie at an angle to the bar, as shown in Fig. 3 of the drawings, and in such a direction that as the drum 7 revolves the material contained therein and carried around with said drum will strike said deflector-plates 36 and be carried by their angular arrangement toward the end of the drum 7, at which it is discharged. The vibration of the bar 31 not only prevents any tendency of the particles to cohere and keeps the mass in a granulated or pulverized condition, but as said bar is separated from the cylindrical wall of the drum 7 by a space which increases constantly though gradually as the exit end of the drum is approached it is evident that a correspondingly-greater quantity of the material in the drum 7 will pass between the scraper-bar 31 and the cylindrical wall of said drum at each revolution of the latter. Thus the mass of the material in the drum will have a constantly and uniformly retarded feed movement as it approaches the point where it is discharged. It is thus subjected more frequently to the action of the separator as the constituents eliminated from it are removed. In this manner a very complete separation can be effected by the automatic action of the apparatus.

The functions of the scraper-bar can be regulated by giving it a greater or less range of vibration. This may be done in several ways, one of which is shown in Fig. 2. In this construction the pitman 34 has an adjustable connection with the scraper-bar, so that it may engage it at various distances from the pivotal support on the upright 30. The nearer the point of engagement approaches this pivotal support the greater will be the range of vibration of the scraper-bar. The pitman is operated by a crank on the shaft 24, as already described; but to permit its longitudinal adjustment on the scraper-bar 31 the end of the pitman which engages the crank 35 is provided with a ring 37, as shown in Figs. 3 and 4, from the lower inner face of which an arm 38 rises, its upper end having a collar 39, which loosely engages the crank.

A pipe 40 enters one end of the drum 7 and connects with a pipe 41, having numerous perforations 42, which lie suitably near the inner face of the drum. A separate pipe 43, entering the outer cylinder 1 near one end, connects with a perforated pipe 44, arranged close to the outer face of the drum 7. These pipes are supplied with steam, compressed air, or hot water, preferably the latter, from any convenient source. When the apparatus needs cleaning, it is not stopped, but the supply of material to the drum 7 ceases. By opening a cock 45 in the pipe 40 water or steam is sprayed into the drum, its action being aided by the revolution of the latter. The exterior of the drum and the interior of the cylinder 1 are washed by means of the pipe 43, which has a valve 46, the operation being assisted and expedited by the rapid rotation of the drum 7.

It will be understood that when fluids are treated by this apparatus the spiral conveyers 21 and 25 are unnecessary.

I do not confine myself to the use of any special filtering medium nor to the use of a double cylindrical wall for the drum 7, with a filtering material packed between. I may use ordinary filter-press cloth wrapped around the drum 7 and held by wire or by flexible perforated plates. Moreover, there are some waters which contain undesirable material, although when separated it forms an excellent filtering medium. In treating such waters the scraper-bar 31 can be so adjusted as to allow a suitable deposit of such material to form on the interior of the drum 7, the further increase of the deposit being prevented and its thickness being kept substantially uniform by the action of the scraper-bar.

When it is desired to filter water or other liquids, I can do it in the following manner, viz: By feeding into the original feed-opening finely-ground filter-stone—in other words, any filtering medium in a fine granular condition. This filtering medium distributes itself evenly over the inner surface of the inner cylinder. It can be known when a sufficient quantity has been fed to the filter by the fact of the filtering medium commencing to discharge itself at the discharge end of the apparatus. When there is a sufficient quantity in the apparatus, then the water can be turned on. The filtering medium being held in its position by the centrifugal motion of the machine and the water to be filtered is thereby forced by centrifugal force through the filtering medium, and all foreign accumulations are caused to be worked off and out of the apparatus by the mechanism already described.

Having thus described my invention, what I claim as new, and desire to secure by Letters Patent of the United States, is—

1. A centrifugal separator, having an outer cylinder, an inner perforated drum on hollow shafts, cylindrical boxes lying in said shafts and extending into the ends of the drum, and spiral conveyers in said boxes, one of the latter being provided with a hopper-opening in its outer end and the other with a receiving-opening in its inner end, substantially as described.

2. In a centrifugal separator, the combination with an outer cylinder and an inner perforated drum on tubular shafts which extend into the ends of said drum, of spiral conveyers arranged to revolve in fixed boxes in said tubular shafts and adapted to feed material in at one end and discharge the same at the other end of said drum, substantially as described.

3. In a centrifugal separator, the combination with a perforated drum capable of rotation, of a scraper-bar pivoted at one end in said drum near the perforated wall, and means for rapidly vibrating the other end of said scraper-bar toward and from the perforated wall, substantially as described.

4. In a centrifugal separator, the combination with a perforated drum and with means for rotating the same, of a scraper-bar pivoted at one end within said drum means for vibrating the other end of said bar toward and from the perforated wall of the drum, and deflector-plates arranged on the upper face of said scraper-bar at an angle to the plane of revolution, substantially as described.

5. In a centrifugal separator, the combination with a perforated drum, and with means for revolving the same, of a scraper-bar in said drum pivoted at one end to a fixed support, means for giving the other end of said bar a variable range of vibration, and fixed deflector-plates arranged on the upper face of the scraper-bar at an angle to the plane of revolution of the drum, substantially as described.

6. In a centrifugal separator, the combination with a perforated drum and with means for revolving the same on a horizontal axis of a scraper-bar pivoted at one end to a fixed support in said drum, means for giving vibration to the other end in a vertical plane, and deflector-plates mounted on the upper face of said bar at an angle to the plane of revolution of the drum, substantially as described.

In testimony whereof I have hereunto set my hand in presence of two subscribing witnesses.

WALTER H. COOK.

Witnesses:
 LAURENCE JANIN,
 PORTER PARKER.